United States Patent [19]
Sekizawa

[11] 3,982,437
[45] Sept. 28, 1976

[54] READILY ZEROED PRESSURE GAGE OF SPHYGMOMANOMETER

[75] Inventor: Shine Sekizawa, Fujisawa, Japan

[73] Assignee: Tokyo Iryoki Kabushiki Kaisha, Tokyo, Japan

[22] Filed: Jan. 28, 1976

[21] Appl. No.: 653,376

[52] U.S. Cl. .................................. 73/410; 73/420
[51] Int. Cl.² .......................................... G01L 7/06
[58] Field of Search ............ 73/410, 417, 385, 386, 73/406, 407 R, 420; 128/2.05 G

[56] References Cited
UNITED STATES PATENTS

| | | |
|---|---|---|
| 1,239,565 | 9/1917 | Collinson ............................. 73/410 |
| 3,342,077 | 9/1967 | Bonnell et al ......................... 73/410 |
| 3,738,157 | 6/1973 | Sekizawa ............................. 73/410 |

Primary Examiner—Donald O. Woodiel
Attorney, Agent, or Firm—Haseltine, Lake & Waters

[57] ABSTRACT

An expansible, pressure-sensitive, metallic element is screw fastened at one side thereof coaxially to a hose connection pipe fitting passing through and fixed to the casing of a sphygmomanometer and is coupled at its other side to a transmission mechanism to an indicator pointer, the metallic element being adjustably turnable and displaceable relative to the transmission mechanism by a tool inserted through the pipe fitting thereby to set the pointer at zero reading for zero gage pressure. Alternatively, an actuating member coupled to the transmission mechanism is screw fastened to one side of the metallic element, which is fixed on its other side to the pipe fitting, and the actuating member is adjustably turnable and displaceable relative to the transmission mechanism by a tool inserted through the pipe fitting and interior of the metallic element thereby to set the pointer at zero reading.

5 Claims, 2 Drawing Figures

READILY ZEROED PRESSURE GAGE OF SPHYGMOMANOMETER

BACKGROUND OF THE INVENTION

This invention relates generally to techniques in hemadynamometry or sphygmomanometry, that is, measurement of blood pressure of a living animal. More particularly, the invention relates to a pressure gage of a sphygmomanometer which gage is so adapted that its zeroing or zero-point adjustment is greatly facilitated.

In general, the pressure gage of a sphygmomanometer has a mechanical arrangement wherein the spindle or shaft of a pressure indicating pointer is rotated by the expansion or contraction in the axial direction of an elastic, pressure-sensitive, expansible, metallic element such as a bellows element or a diaphragm element housed within a casing. The zero-point adjustment or positioning upon completion of fabrication and assembly of the gage has heretofore been accomplished by positional adjustment of the metallic element, and this positional adjustment has been carried out by adjusting, relative to the casing, the position of a hose connection pipe fitting connected to the lower part of the metallic element for connection of an air hose from the inflatable rubber bag of the sphygmomanometer. For this reason, this zero point adjustment has been laborious, and, moreover, fine adjustment has been difficult.

SUMMARY OF THE INVENTION

It is an object of this invention to provide a sphygmomanometer pressure gage in which the zero-point adjustment of the pressure indicating pointer can be carried out readily by a very simple mechanical innovation.

Another and more specific object of the invention is to provide a sphygmomanometer pressure gage in which an actuating member mounted on a pressure-sensitive, metallic element and adapted to drive a pressure indicator through a transmission mechanism is adjustably displaceable relative to the transmission mechanism by a tool inserted from outside of the sphygmomanometer casing through a hose connection pipe fitting thereby to adjustably set the pressure indicator at zero reading at zero gage pressure.

Still another object of the invention is to provide a pressure gage of the above stated character which, in the event that an error develops in the zero setting during use, can be readily readjusted to correct zero setting by an unskilled user without the necessity of calling an expert or returning the sphygmomanometer to the dealer or manufacturer.

A further object of the invention is to provide a pressure gage as stated above which is of relatively simple construction depending principally on screw action for zero adjustment.

According to this invention, briefly summarized, there is provided in a sphygmomanometer of the character referred to above, a pressure gage comprising: the pipe fitting fixed to the casing and connected at its outer end to a hose from the rubber bag; the pressure-sensitive, metallic element connected at one axial end thereof coaxially and communicatively with the other inner end of the pipe fitting within the casing; an actuating member mounted on the other axial end of the metallic element to undergo axial displacement unitarily therewith; a pressure indicating pointer adapted to indicate the blood pressure on a scale upon being actuated by the displacement; transmission means for transmitting the displacement of the actuating member to the pointer; and adjustment means adjustably operable by a tool inserted through the pipe fitting from the outer end thereof to vary the position of the actuating member relative to the transmission means thereby to move and adjust the pointer to the zero reading on the scale for zero gage pressure.

The nature and utility of this invention will be more clearly apparent from the following detailed description with respect to preferred embodiments of the invention when read in conjunction with the accompanying drawing, in which like parts are designated by like reference numerals.

DETAILED DESCRIPTION OF THE INVENTION

Figure 1:
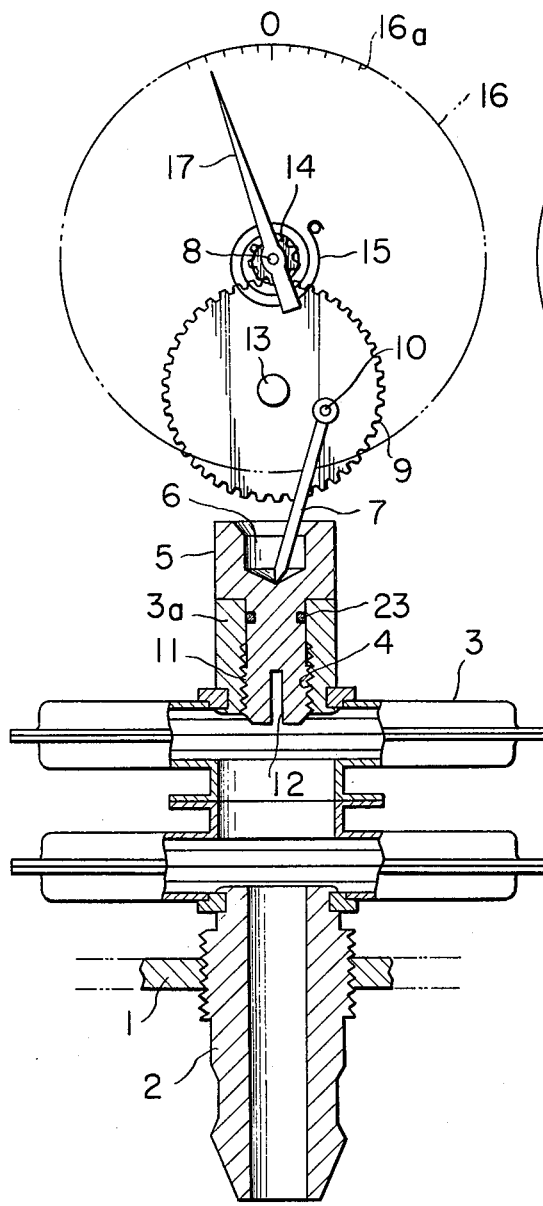
FIG. 1 is a front elevation, with parts cut away and parts shown in vertical section, and with other parts shown schematically, showing the essential parts of a first example of the sphygmomanometer pressure gage according to this invention.

Referring first to FIG. 1, the first example shown therein of the sphygmomanometer pressure gage of the invention has a pipe fitting 2 for hose connection which is fixed by screw connection to the casing 1 of a sphygmomanometer and is fixedly and coaxially connected in an internally communicative manner at its upper end to the bottom part of a double metallic diaphragm element 3. A hose connected at one end to the conventional inflatable rubber bag of the sphygmomanometer is fitted at its other end onto the lower end of this pipe fitting 2. The diaphragm element 3 is provided centrally at its upper part with a hollow cylindrical fitting 3a fixed thereto and having internal (female) screw threads 4, with which external (male) screw threads 11 of a connecting rod seat 5 are engaged. An O-ring 23 is provided between the fitting 3a and the seat 5 to prevent leakage of air therebetween.

The connecting rod seat 5, which is thus screw connected coaxially to the diaphragm element 3, has an upper head part having an upwardly facing central socket 6 with a concave conical bottom. The vertex of this conical bottom receives and is engaged with the lower needle point of a connecting rod 7. The seat 5 thereby functions as a pivotal bearing constituting, cooperatively with the needle point of the connecting rod 7, a needlepoint fulcrum. The seat 5, which is thus coaxially aligned with the pipe fitting 2, is provided at its lower end with a slot 12 facing downwardly toward the fitting 2 and thereby being accessible for engagement by a turning tool as described hereinafter.

The connecting rod 7 is rotatably connected at its other end by a pin 10 to an accentric point on a driving gear 9 rotatably supported by a shaft 13 and meshed with a pinion 14, which is fixed to a spindle or shaft 8 of an indicating pointer 17. The inner free end of a spiral hairspring 15 is fixed to the pointer shaft 8 and continually imparts to this shaft a torque in the counterclockwise direction, whereby a force is imparted to the connecting rod in its return direction in continual following contact with the connecting rod seat 5. The hairspring 15 thus eliminates any backlash or play in the transmission mechanism between the seat 5 and the pointer 17. The pointer 17 is adapted in the conventional manner to indicate pressure in cooperation with a dial 16 calibrated with a graduation scale 16a.

In the assembly of the pressure gage of the above described mechanical organization according to this invention, the hose connection fitting 2, on which the diaphragm element 3 including the fitting 3a and the connecting rod seat 5 is fixedly and unitarily mounted, is fixedly screw fastened to the casing 1, and the lower needle point of the connecting rod 7 is engaged with the vertex of the conical bottom of the socket 6 of the seat 5. Thereafter, a tool such as a screwdriver is inserted through the interiors of the fitting 2 and the diaphragm element 3 and engaged at its tip with the slot 12 in the bottom end of the seat 5. Then, by turning the tool, the vertical position of the seat 5 relative to the diaphragm device 3 and the shaft 13 is adjustably varied to set the pressure indicating pointer 17 at the zero graduation on the scale 16a of the dial 16.

Figure 2:
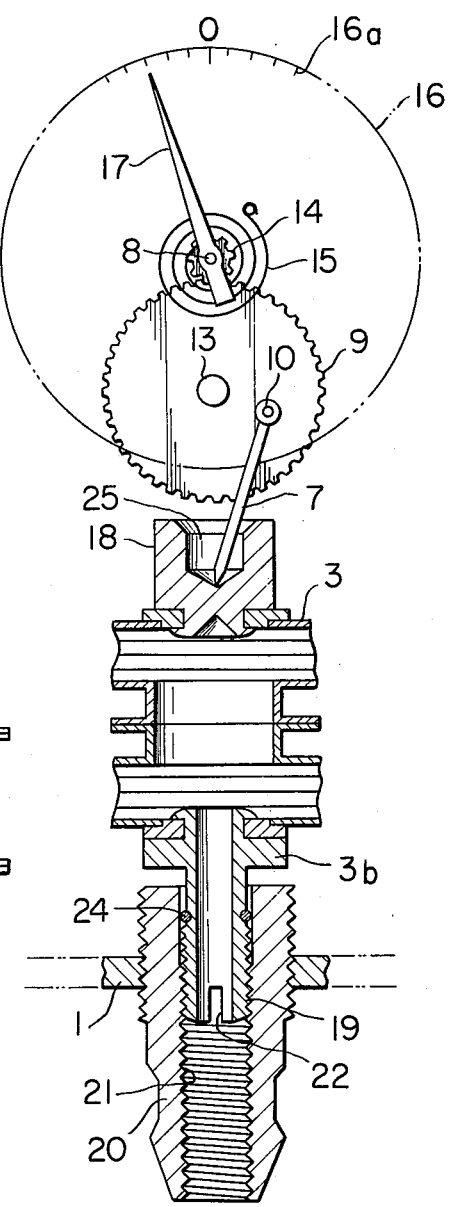
FIG. 2 is a similar elevation showing the essentially parts of a second example of the pressure gage of the invention.

Whereas, in the above described first example of the pressure gage according to this invention, the connecting rod seat 5 is made adjustably movable by screwing it into the fitting 3a fixed to the diaphragm element 3, in a second example of the pressure gage as illustrated in FIG. 2, a connecting rod seat 18 is fixed to the upper central part of the diaphragm element 3, and a tubular member 3b having male screw threads 19 is fixed to the lower central part of the diaphragm element 3 and is scrwed into a hose connection fitting 20 provided with female threads 21 and screw fastened to the casing 1. The hollow interior of the tubular member 3b provides communication between the interior of the diaphragm element 3 and the interior of the fitting 20. An O-ring 24 is provided to assure air-tight sealing between the tubular member 36 and the fitting 20. The tubular member 3b is provided at its lower end with a slot 22 for receiving and engaging with a turning tool.

The connecting rod seat 18 is provided with a central socket 25 similar to the socket 6 in the seat 5 of the first example. This socket 25 receives the needle point of a connecting rod 7, which is part of a motion transmission mechanism to a pointer 17. These parts are exactly the same as those of the first example and, therefore will not be described again in detail.

For zero-point adjustment of the above described pressure gage, a tool such as a screwdriver is inserted through the lower part of the hose connection fitting 20, and its tip is fitted into the slot 22 of the tubular member 3b. Then, by turning the tool, the vertical position of the unitary assembly of the tubular member 3b, the diaphragm element 3, and the connecting rod 18 relative to the casing 1 and the shaft 13 is adjustably varied to set the pressure indicating pointer 17 at the zero graduation on the scale 16a of the dial 16.

Thus, the zero-point adjustment of the pressure gage according is accomplished in a very simple manner by merely turning a tool such as a screwdriver inserted through the hose connection fitting 2 (or 20) and fitted in the slot 12 (or 22) and observing the position of the pointer 17 on the scale 16a. Accordingly, there is no necessity of resorting to the laborious procedure of fine adjustment of the mounting of the gage onto the casing 1, and the zero-point adjustment can be carried out accurately by persons other than highly skilled workers.

Still another advantageous feature of this invention is that, should an error develop in the zero setting of the gage after its purchase by a user, it would be a simple matter for the user, himself, to carry out readjustment of the zero point without calling an expert or returning the sphygmomanometer to the dealer or manufacturer.

I claim:

1. In a sphygmomanometer having a casing (1), an inflatable bag for detecting blood pressure, and a hose connected at its one end to the bag, the combination therewith of a pressure gage comprising:
    a pipe fitting (2, 20) inserted through and fixed to a wall of the casing and connected at one outer end thereof to the other end of the hose;
    an expansible, pressure-sensitive, metallic element (3) having a hollow interior and a central axis and connected at one axial end thereof coaxially and communicatively with the other inner end of the pipe fitting within the casing, the other axial end of the metallic element undergoing axial displacement in accordance with detected blood pressure transmitted through the hose as air pressure into the interior of the element;
    an actuating member (5, 18) connected to said other axial end of the metallic element thereby to undergo axial displacement unitarily therewith;
    a pressure indicating pointer (17) adapted to indicate the blood pressure on a calibrated scale (16a) upon being actuated by said displacement;
    transmission means (7, 10, 9 14, 8) for transmitting said displacement from the actuating member to the pointer; and
    adjustment means (11, 4, 12, 21, 19, 22) adjustably operable by a tool inserted through the pipe fitting from said one outer end thereof to vary the position of the actuating member relative to the transmission means thereby to move and adjust the pointer to the zero graduation on the scale for zero gage pressure.

2. The combination as set forth in claim 1 in which the metallic element (3) is connected fixedly to said other inner end of the pipe fitting (2), and the actuating member (5) has a screw threaded part (11) engaged with a screw threaded part (4) of a hollow cylindrical fitting (3a) fixed coaxially to said other axial end of the metallic element and is adjustably turnable by said tool, the adjustment means comprising the actuating member, said screw threaded part thereof, said hollow cylindrical fitting, and said screw threaded part thereof.

3. The combination as set forth in claim 1 in which the actuating member (18) is fixedly connected to said other axial end of the metallic element (3), and the pipe fitting (20) has a screw threaded part (21) engaged with a screw threaded part (19) of a tubular member (3b) internally communicatively and coaxially fixed to said one axial end of the metallic element, the adjustment means comprising the pipe fitting, said screw threaded part thereof, said tubular member, and said screw threaded part thereof.

4. The combination as set forth in claim 2 in which the actuating member is a connecting rod seat (5) having a central socket (6) with a concave conical bottom, and the transmission means comprises a connecting rod (7) having a needle point end seated in the vertex of the conical bottom of the central socket, a driving gear (9) rotatably supported on a shaft (13), a pin (10) rotatably connecting the other end of the connecting rod to an eccentric point on the driving gear, a pinion (14) meshed with the driving gear to be driveable thereby, a pointer spindle (8) fixed to the pinion and to the pressure indicating pointer, and a spring (15) fixed at one end to the pointer spindle and continually imparting thereto a torque tending to apply a force to the connecting rod in the returning direction thereto urging the rod into continual following contact with the connecting rod seat.

5. The combination as set forth in claim 3 in which the actuating member is a connecting rod seat (18) having central socket (25) with a concave conical bottom, and the transmission means comprises a connecting rod (7) having a needle point end seated in the vertex of the conical bottom of the central socket, a driving gear (9) rotatably supported on a shaft (13), a pin (10) rotatably connecting the other end of the connecting rod to an eccentric point on the driving gear, a pinion (14) meshed with the driving gear to be driveable thereby, a pointer spindle (8) fixed to the pinion and to the pressure indicating pointer, and a spring (15) fixed at one end to the pointer spindle and continually imparting thereto a torque tending to apply a force to the connecting rod in the returning direction thereto urging the rod into continual following contact with the connecting rod seat.

* * * * *